UNITED STATES PATENT OFFICE.

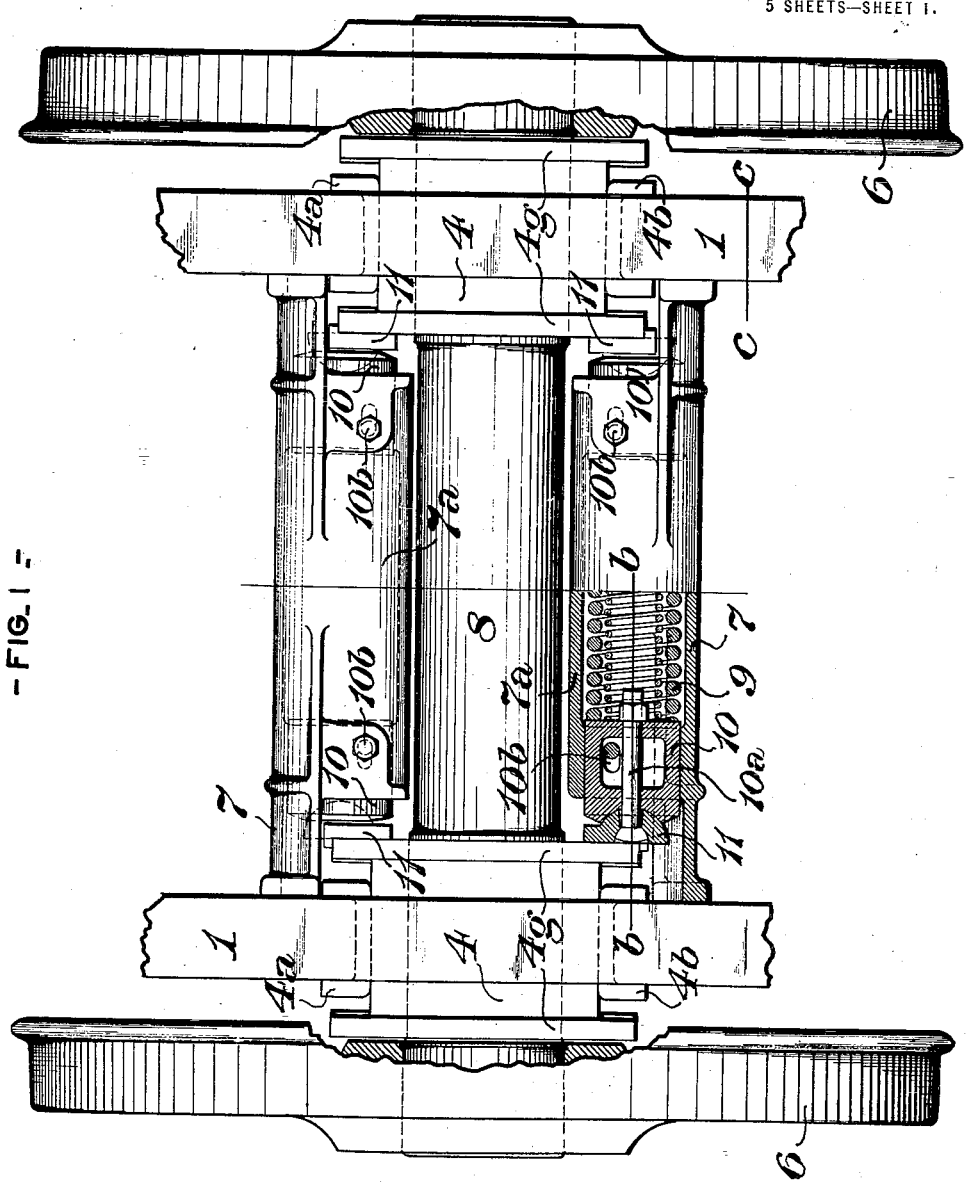

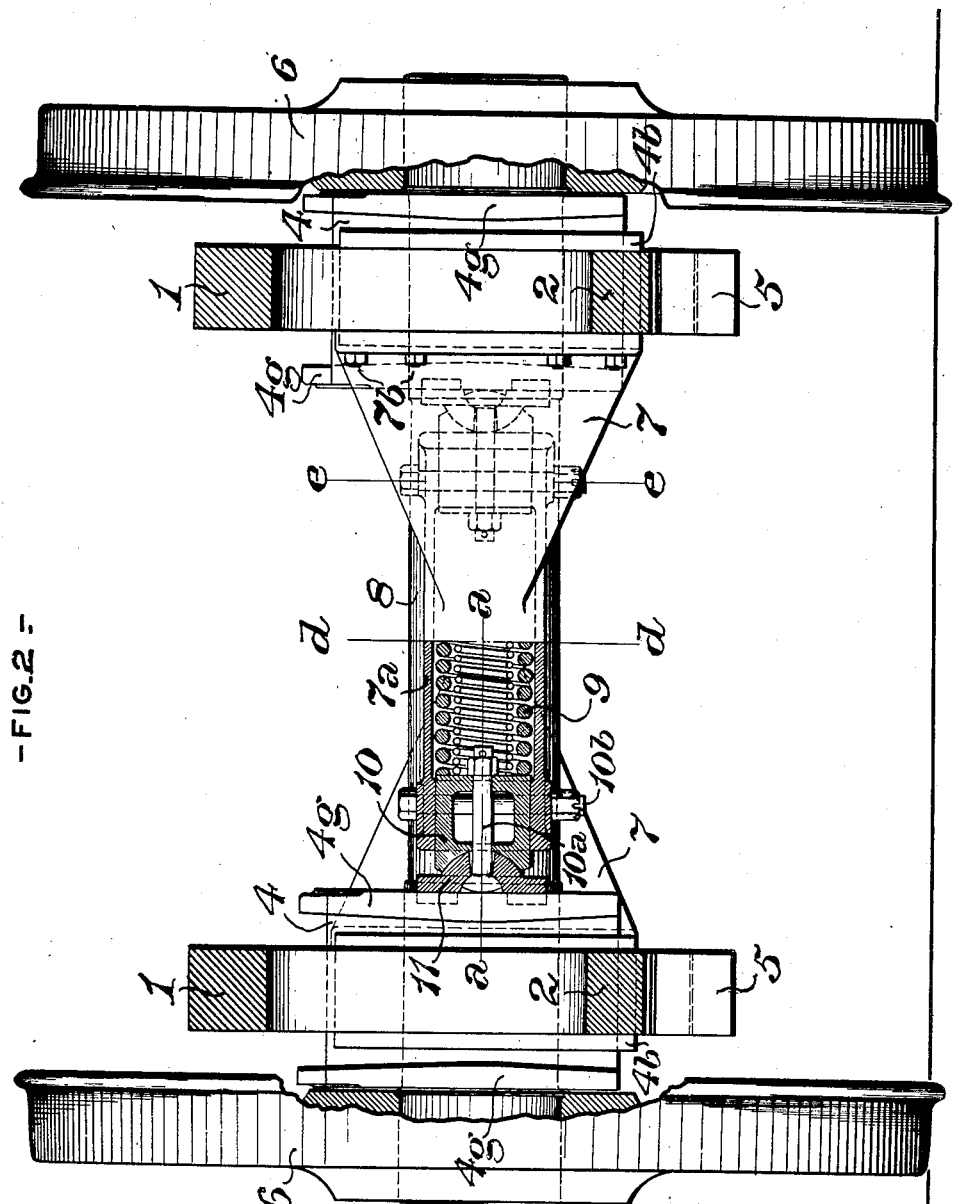

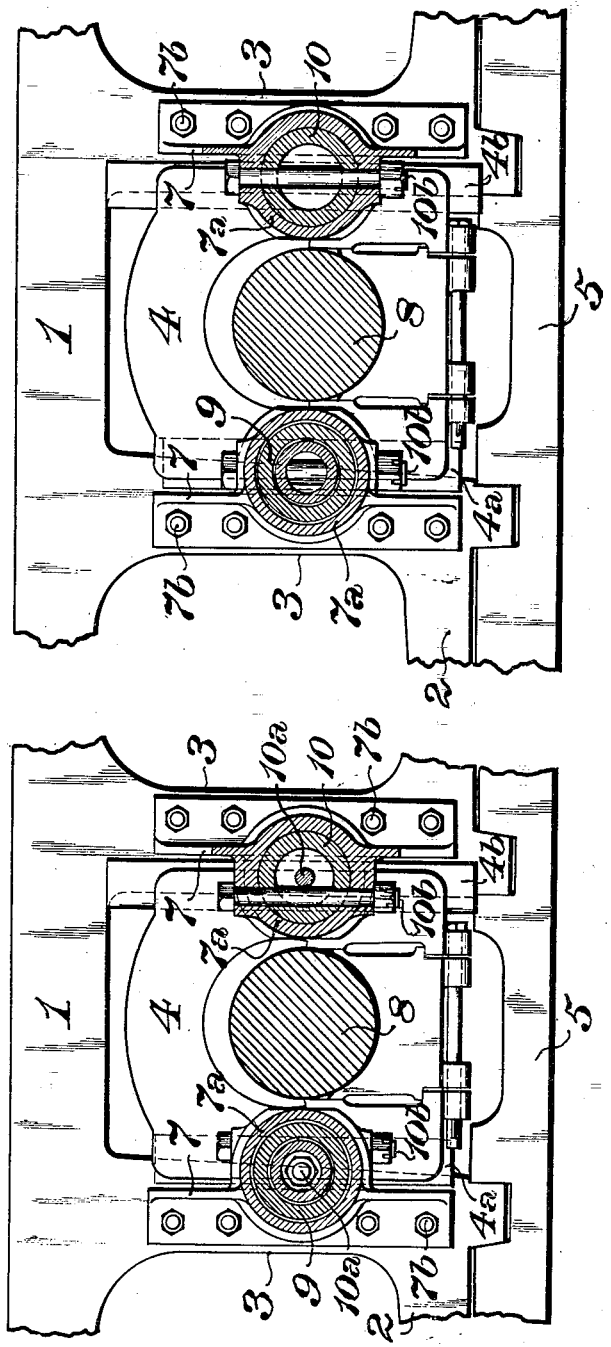

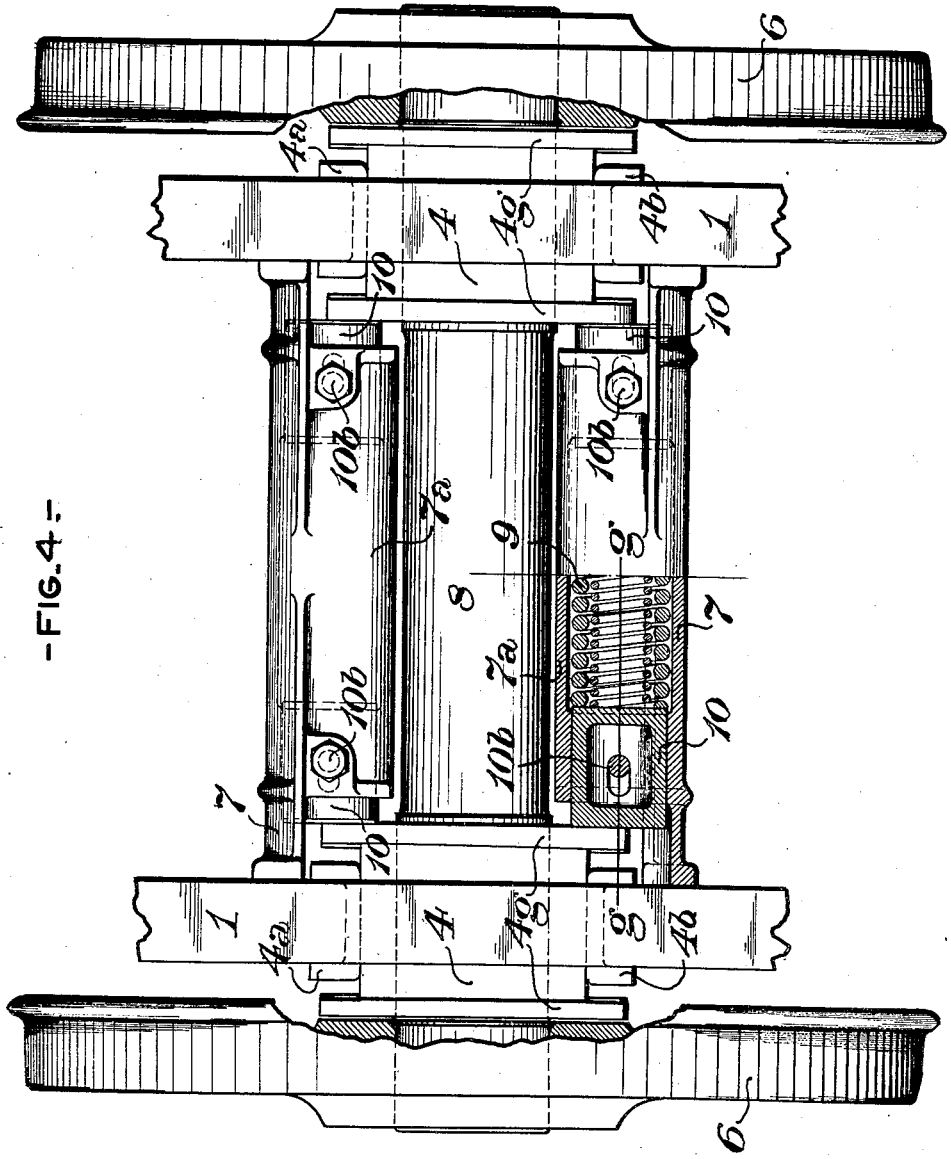

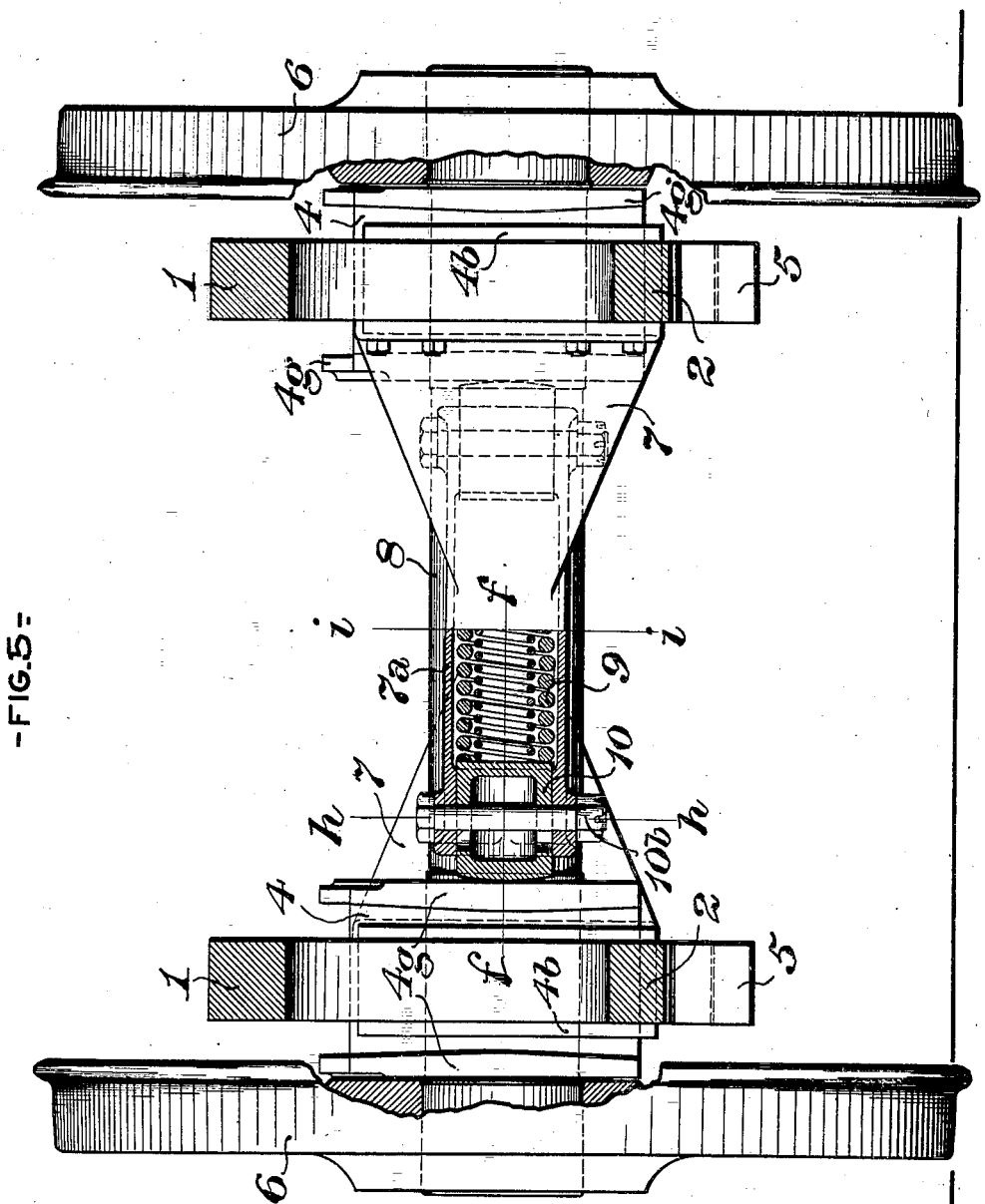

FRANCIS J. COLE, OF SCHENECTADY, NEW YORK.

LATERAL-MOTION APPLIANCE FOR LOCOMOTIVE DRIVING-BOXES.

1,177,305.  Specification of Letters Patent.  Patented Mar. 28, 1916.

Application filed December 9, 1915. Serial No. 65,918.

*To all whom it may concern:*

Be it known that I, FRANCIS J. COLE, of Schenectady, in the county of Schenectady and State of New York, have invented a certain new and useful Improvement in Lateral-Motion Appliances for Locomotive Driving-Boxes, of which improvement the following is a specification.

My invention relates to means for affording and controlling lateral motion in the driving boxes of locomotive engines, and its object is to provide an appliance of such type which shall be of simple construction and ready applicability in locomotives of the various present standard types, with the operative result of enabling a locomotive having a comparatively long rigid wheel base to pass through curves of comparatively short radius, without liability to derailment, and without inducing undue or excessive wear of wheel flanges and rails.

The improvement claimed is hereinafter fully set forth.

In the accompanying drawings: Figure 1 is a plan or top view, partly in section on the line $a\ a$ of Fig. 2, of a portion of a locomotive frame and a pair of driving boxes, illustrating an application of my invention; Fig. 2, a vertical transverse section through the frame members, taken partly on the line $b\ b$ and partly on the line $c\ c$ of Fig. 1; Fig. 3, a vertical section, taken parallel with the frame members, partly on the line $d\ d$ and partly on the line $e\ e$ of Fig. 2; Fig. 4, a view, illustrating a structural modification, taken similarly to Fig. 1, a portion being in section on the line $f\ f$ of Fig. 5; Fig. 5, a vertical transverse section through the frame members of Fig. 4, a portion being in section on the line $g\ g$ thereof; and Fig. 6, a vertical section taken parallel with the frame members, partly on the line $h\ h$ and partly on the line $i\ i$ of Fig. 5.

My invention is herein exemplified as applied in connection with a locomotive engine, the frame of which is of the standard "bar" type, and comprises two side members, which are, as in present standard practice, spaced at the maximum distance apart available under the necessary limitation imposed by the width between driving wheel hubs. Each of the side frame members comprises, so far as the portion thereof in which the driving axles are fitted is concerned, the usual top rail, 1, bottom rail, 2, and connecting vertical pedestal, each of which consists of a pair of pedestal jaws, 3, in which a driving box, 4, is fitted between a wedge, $4^a$, and a shoe, $4^b$, in the ordinary manner. The open spaces between the sections of the lower frame rail at the bottoms of the pedestals are spanned by pedestal ties, 5, suitably connected to the bottom frame rail.

Referring first to Figs. 1 to 3 inclusive, in the practice of my invention, the driving boxes, 4, of the leading driving axle, 8, are of substantially the ordinary construction, except in the particular that they afford a materially greater space for lateral motion between their end flanges, $4^g$, and the pedestal wedges, $4^a$, and shoes, $4^b$, than in usual practice. Ordinarily, about one thirty second of an inch of lateral motion, on each side, is provided, but in this instance, the space between the end flanges of the driving boxes has been made such that the lateral motion of the driving boxes shall be about one inch on each side.

The opposite side frame members are connected, on each side of the driving axle, 8, by one of a pair of cross ties or spacers, 7, having flanges on their ends which are secured to the pedestal jaws, 3, by bolts, $7^b$. A cylindrical spring case, $7^a$, is formed on each of the cross ties, and a helical spring, 9, is fitted in each of the spring cases. Inner and outer spring coils, of different tension, may, as shown in the drawings, be applied in the spring cases, instead of single springs. The springs, 9, abut at their ends, on plungers, 10, which are fitted to slide longitudinally in the ends portions of the spring cases, which are bored out to admit of their movement therein without undue friction. The outward movements of the plungers, effected by the tension of the springs, 9, are limited by transverse stop pins, $10^b$, fitted in the spring cases, said stop pins also providing abutments for the springs when pressed in the opposite direction. A shoe, 11, having a spherical face fitting a corresponding recess in the outer end of the plunger, is flexibly connected to each of the plungers by a horizontal bolt, $10^a$, the opposite faces of the shoes abutting on the inner flanges, $4^g$, of the driving boxes.

The distance between the outer or working faces of the shoes, 11, is made exactly equal to the distance between the inner flanges of the driving boxes, when the latter are in their central positions relatively to the frame members, and the ordinary degree of lateral motion is provided between the boxes, when in central position. The usual practice in locomotive building, for standard gage, is to allow one eighth of an inch on each side between the wheel hubs and the outer faces of the driving boxes, and this practice may be followed under my invention.

The structural modification illustrated in Figs. 4 to 6 inclusive, accords, in all substantial particulars, with the construction above described, and differs therefrom in that the shoes, 11, are dispensed with, and the plungers bear directly on the inner faces of the driving boxes.

It will be obvious that, if desired, the driving boxes of the rear driving axle may be adapted for lateral motion, in the same manner as those of the leading driving axle.

In the operation of a locomotive engine in which my invention is applied, when the locomotive enters a curve, if sufficient pressure is exerted against the flange of the driving wheel on the outer side of the curve by the contact thereof with the outer rail, the outer driving box will be deflected from its central position, thereby compressing the springs, and the wear of the flanges of the leading pair of driving wheels will be reduced, inasmuch as the pressure can not become excessive before deflection or lateral motion takes place. The wear of the rails will be correspondingly reduced, and the traverse of the locomotive through curves be facilitated. A further advantage of my invention is attained in the ability to apply it in locomotives of the ordinary construction and with driving boxes of the usual length.

I claim as my invention and desire to secure by Letters Patent:

1. In a locomotive engine, the combination of two side frame members, a cross tie connecting said members, driving boxes fitted with the capacity of lateral motion in said members, and a spring supported in the cross tie and exerting end thrust on the driving boxes.

2. In a locomotive engine, the combination of two side frame members, driving boxes fitted with the capacity of lateral motion therein, a driving axle journaled in said driving boxes, plungers adapted to exert end thrust on the driving boxes, and a spring interposed between and bearing on said plungers.

3. In a locomotive engine, the combination of two side frame members, driving boxes fitted with the capacity of lateral motion therein, a driving axle journaled in said driving boxes, plungers adapted to exert end thrust on the driving boxes, a spring interposed between and bearing on said driving boxes, and stops limiting the traverse of the plungers.

4. In a locomotive engine, the combination of two side frame members, driving boxes fitted with the capacity of lateral motion therein, a driving axle journaled in said driving boxes, a cross tie connecting the side frame members, plungers fitted to traverse in the cross tie, shoes flexibly connected to said plungers and abutting on the driving boxes, and a spring interposed between and bearing on the plungers.

5. In a locomotive engine, the combination of two side frame members, driving boxes fitted with the capacity of lateral motion therein, a driving axle journaled in said driving boxes, cross ties connecting the side frame members on opposite sides of the driving axle, plungers fitted in each of said cross ties and adapted to exert end thrust on the driving boxes, and a spring interposed between and bearing on the plungers of each cross tie.

FRANCIS J. COLE.

Witnesses:
FRANK F. SCOVILLE,
S. W. TYLER.